(12) United States Patent
Tanaka et al.

(10) Patent No.: US 8,788,726 B2
(45) Date of Patent: Jul. 22, 2014

(54) DATA TRANSMISSION SYSTEM, STORAGE MEDIUM AND DATA TRANSMISSION PROGRAM

(75) Inventors: Shingo Tanaka, Yokohama (JP); Takahiro Yamaura, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 292 days.

(21) Appl. No.: 13/234,564

(22) Filed: Sep. 16, 2011

(65) Prior Publication Data

US 2012/0110397 A1 May 3, 2012

(30) Foreign Application Priority Data

Oct. 29, 2010 (JP) ................................. 2010-244671

(51) Int. Cl.
*G06F 13/14* (2006.01)
(52) U.S. Cl.
USPC ..................... 710/33; 710/36; 710/52; 710/20
(58) Field of Classification Search
None
See application file for complete search history.

(56) References Cited

U.S. PATENT DOCUMENTS

| 6,996,070 | B2* | 2/2006 | Starr et al. ..................... 370/252 |
| 7,424,710 | B1* | 9/2008 | Nelson et al. ..................... 718/1 |
| 7,523,179 | B1* | 4/2009 | Chu et al. ....................... 709/222 |
| 7,676,607 | B2* | 3/2010 | Jung et al. ........................ 710/33 |
| 7,688,838 | B1* | 3/2010 | Aloni et al. ..................... 370/412 |
| 7,735,099 | B1* | 6/2010 | Micalizzi, Jr. ................. 719/328 |
| 7,813,339 | B2* | 10/2010 | Bar-David et al. ............. 370/389 |
| 2007/0033301 | A1* | 2/2007 | Aloni et al. ..................... 710/22 |
| 2012/0023275 | A1* | 1/2012 | Yamashita ....................... 710/52 |

FOREIGN PATENT DOCUMENTS

| JP | 2005-316629 | 11/2005 |
| JP | 2006-352784 | 12/2006 |
| JP | 2008-016037 | 1/2008 |
| WO | 2011016087 A1 | 2/2011 |

OTHER PUBLICATIONS

Japanese Office Action for Japanese Application No. 2010-244671 mailed on Oct. 16, 2012.

* cited by examiner

*Primary Examiner* — Cheng-Yuan Tseng
(74) *Attorney, Agent, or Firm* — Amin, Turocy & Watson, LLP

(57) ABSTRACT

A system has a processor configured to be capable of read and write to a main memory, a storage configured to transmit stored data per block on an I/O bus, and a protocol processing apparatus connected to the I/O bus and configured to perform a communication protocol process on behalf of the processor. The processor includes a specifying part configured to specify data per block to be transmitted from the storage, and an indicating part configured to indicate data transfer from the storage to the protocol processing apparatus by specifying address information of the protocol processing apparatus. The protocol processing apparatus includes a receiving part configured to directly receive data transferred per block from the storage to the I/O bus, without relaying the main memory, and a network processing part configured to transmit the data received per block by the receiving part over a network per packet.

12 Claims, 5 Drawing Sheets

| DEVICE NAME | ADDRESS |
|---|---|
| SYSTEM MEMORY | 0x00000000 ~ 0x1fffffff |
| STORAGE DEVICE | 0x20000000 ~ 0x201fffff |
| TOE | 0x20200000 ~ 0x202fffff |
| ... | ... |

| NUMBER OF TRANSFER INSTRUCTION | TOE ADDRESS |
|---|---|
| TRANSFER INSTRUCTION 0 | 0x20280000 ~ 0x202801ff |
| TRANSFER INSTRUCTION 1 | 0x20280200 ~ 0x202803ff |
| TRANSFER INSTRUCTION 2 | 0x20280400 ~ 0x202805ff |
| . . . | . . . |
| TRANSFER INSTRUCTION 7 | 0x20280e00 ~ 0x20280fff |

| CONNECTION IDENTIFIER | TOE ADDRESS |
|---|---|
| CONNECTION 0 | 0x20280000 ~ 0x20280fff |
| CONNECTION 1 | 0x20281000 ~ 0x20281fff |
| CONNECTION 2 | 0x20282000 ~ 0x20282fff |
| ... | ... |

DATA TRANSMISSION SYSTEM, STORAGE MEDIUM AND DATA TRANSMISSION PROGRAM

CROSS REFERENCE TO RELATED APPLICATIONS

This application is based upon and claims the benefit of priority from the prior Japanese Patent Application No. 2010-244671, filed on Oct. 29, 2010, the entire contents of which are incorporated herein by reference.

FIELD

Embodiments of the present invention relate to a data transmission system, a storage medium, and a data transmission program, provided with a TOE apparatus for performing a communication protocol process on behalf of a processor.

BACKGROUND

HDD (Hard Disk Drive), SSD (Solid State Drive), etc. directly attached to a computer are referred to as DAS (Direct Attached Storage). What is popular now is a network storage in which these storages are connected to a host via a network. The network storage is generally categorized into SAN (Storage Area Network) and NAS (Network Attached Storage). iSCSI, Fiber Channel, etc. are known as SAN. In the case of SAN, a storage apparatus is connected, as block device, to a host machine (a machine that uses the storage) having a file system, via a network. As for NAS, for example, NFS (Network File System) is known. In the case of NAS, a file system is installed in a storage apparatus so that a host machine can access the file system from the upper level. Therefore, NAS is advantageous in that the host machine bears a smaller load and a plurality of host machines can share the file system of the storage apparatus.

For these network storages, the Ethernet is mainly used as the communication means and, for example, TCP/IPT widely used in the Internet is used as communication protocol. With these widely-used general-purpose techniques, the usage of the network storage becomes easier and the scalability, maintainability, etc. of the network storage are improved compared to known DAS.

In relation to the network storage Video streaming distribution has been popular recently. The streaming distribution is performed by a content distribution server that is called a VDD (Video On Demand) server, for example. This type of content distribution server performs a process of retrieving video content from its own storage server and transmits the content to a user terminal connected via a network. Therefore, the content distribution server may also be referred to as a network storage, in a broad sense. The communication protocol for the content distribution server is TCP/IP-based HTTP, RTP for real-time communication, etc. RTP uses FEC (Forward Error Correction) for error correction, for example.

Devices such as a storage and a network used as the network storage described above have exhibited a higher transfer rate. At present, 1 Gbps is mainly used for the Ethernet and 10 Gbps is used for data centers, for example. The specification definition for the next-generation 40 Gbps/100 Gbps Ethernet has been completed, which is expected to be gradually popular. As for the storage, in addition to higher transfer rate for RAID-configured HDD with striping (parallelization), the transfer performance of SSD has becomes, markedly higher recently, with 2 Gbps or above even for single SSD now available on the market. Moreover, concerning SATA, the I/F standards for storage devices, SATA3.0 with a 6-Gbps bandwidth has already been popular. With these trends taken into consideration, it is expected that a network storage with a 10-Gbps bandwidth will appear in the near future.

With such higher performance of the network storage, a host CPU that controls the network storage has to bear a heavier processing load. Conventionally, this problem is solved by a technique called TCP/IP offload engine (hereinafter, TOE). The TOE is provided with a dedicated processor or circuit for performing the process of TCP/IP described above on behalf of a host CPU to offload TCP/IP processing load from the host CPU. With the TOE, a higher-speed TCP/IP process than a known protocol process by software is achieved for higher performance of the network storage.

A storage device and TOE are control by a host CPU as a slave, with data input and output via a system memory. Therefore, when data in a storage is output/input over a network, data transfer between a storage device (such as SSD and HDD) and TOE is always done via a system memory.

Moreover, it occasionally happens that the transferred data is copied for several times in the system memory, which is done by application software running on a host CPU that bridges the storage device and the TOE, a data passing process between OS Kernel space and user space, etc. Especially, in the case of NAS, it is required to run a file system. With an ordinary file system being installed, data retrieved for each sector of a fixed byte length is transformed into a file of a given byte length, which causes data copy.

As explained above, data transfer between a storage device and TOE requires that a host CPU run software, hence read/write to a system memory has to be performed at least once. Moreover, the data transfer causes memory copy for several times in some cases in the system memory due to OS, application or file system processing, resulting in much heavier load to the system memory.

Conventionally, such a heavy load to the system memory is covered by a host CPU having high processing performance and a high-speed system memory. However, such a heavy load gradually becomes a problem for a transfer rate of recent network storages approaching 10 Gbps. Particularly, higher performance of a system memory requires a higher-grade host CPU and also a higher-grade chip set in the case of a PC or server, which makes a problem of cost, power consumption, etc. remarkable.

DETAILED DESCRIPTION

Embodiments will now be explained with reference to the accompanying drawings.

A data transmission system has a processor configured to be capable of read and write to a main memory device, a data storage apparatus configured to transmit stored data per block on an I/O bus, and a protocol processing apparatus connected to the I/O bus and configured to perform a specific communication protocol process on behalf of the processor. The processor includes a data specifying part configured to specify data per block to be transmitted from the data storage apparatus, and a transfer indicating part configured to indicate data transfer from the data storage apparatus to the protocol processing apparatus by specifying address information of the protocol processing apparatus. The protocol processing apparatus includes a data receiving part configured to directly receive data transferred per block from the data storage apparatus to the I/O bus, without relaying the main memory device, and a network processing part configured to transmit the data received per block by the data receiving part over a network per packet.

First Embodiment

Figures 1, 2:
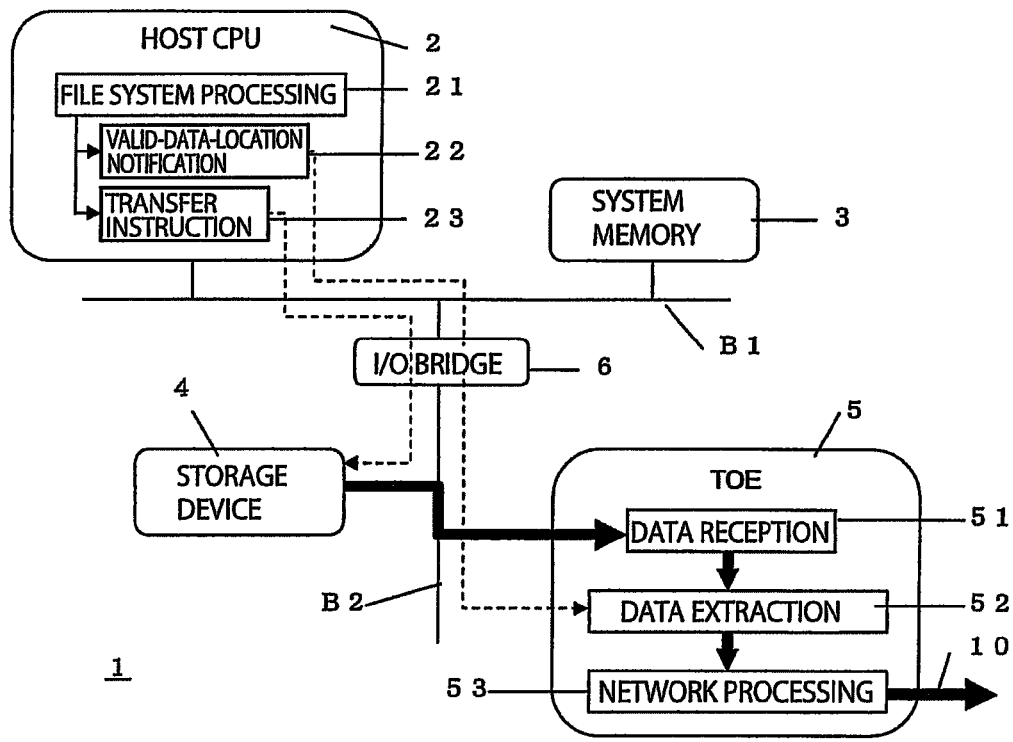
FIG. 1 is a view schematically showing the configuration of a data transmission system according to a first embodiment.
FIG. 2 is a view showing an example of main memory space.

FIG. 1 is a view schematically showing the configuration of a data transmission system 1 according to a first embodiment. The data transmission system 1 of FIG. 1 may be put into practical use as a network storage, for example, a PC, a server, an SoC (System on Chip), an FPGA (Field Programmable Gate Array), a VOD (Video On Demand) server, etc. although not limited to these products.

The data transmission system 1 of FIG. 1 has a host CPU (a processor) 2, a system memory 3, a storage device (a data storage apparatus) 4, and a TOE (a protocol processing apparatus) 5. The host CPU 2 performs the entire system control. The host CPU 2 has, as main processing parts achieved with software, a file-system processing part (data specifying part) 21, an valid-data-location notifying part 22 for notifying the TOE 5 of an valid data location of data to be transferred and a transfer indicating part 23 for instructing the storage device 4 of data transfer. Not only the above, the host CPU 2 can perform several other processes.

The system memory 3 is used by the host CPU 2, as a main memory. It is divided into a plurality of memory areas that are mapped on a main memory space of the host CPU 2. The system memory 3 is actually an SSD (Solid State Drive), an HDD (Hard Disk Drive), etc.

The TOE 5 executes a network protocol process on behalf of the host CPU 2. The TOE 5 has a data receiving part 51 for receiving data transferred from the storage device 4, a data extracting part 52 for extracting valid data from the received data, and valid-data location information, and a network processing part 53 for transmitting the extracted data over a network 10.

The host CPU 2 and the system memory 3 are connected to a main bus B1. The storage device 4 and the TOE 5 are connected to an I/O bus B2. Provided between the main bus B1 and the I/O bus B2 is an I/O bridge 6. Here, the I/O bus B2 is a chip set when the present system is a PC, server, etc. or a PCI-Express bus. It is a bus in a chip when the present system is an SoC, an FPGA, etc. Accordingly, the I/O bus B2 can take a variety of forms as long as it allows direct communications between different apparatuses and does not occupy a bus bandwidth of the main bus B1.

Usually, the host CPU 2 controls the storage device 4 and the TOE 5 by running control software such as a device driver.

The TOE 5 may be configured with either hardware or software. The protocol to be executed by the TOE 5 is not limited to TCP/IP. It can be any communication protocol, such as HTTP or RTP. Here, such communication protocol to be executed by the TOE 5 is referred to as TOE 5.

The storage device 4 manages data per group of data that is called a sector or cluster which are referred to as a block as a generic name. Users do not treat data per block, hence the storage device 4 is usually accessed by a file system. The file system accesses data using a mechanism of mapping byte data on a memory area per block. A known file system is used in the present embodiment, hence the explanation thereof is omitted.

In FIG. 1, arrows with a dot line and a solid line indicate the flow of control and of transferred data, respectively. In this embodiment, data is retrieved from the storage device 4 and directly transferred to the TOE 5 through the I/O bus B2 and transmitted over the network 10 from the TOE 5.

An operation of the data transmission system 1 of FIG. 1 will be explained next. Firstly, the host CPU 2 specifies a file to be transmitted by executing a given application (not shown), for example. A typical example is that the host CPU 2 requests a file from another apparatus connected to the network 10. This process is not related to the present embodiment, hence the detailed explanation thereof is omitted.

Next, the file-system processing part 21 analyses a file system in the storage device 4 to identify a block group in which data of the specified file is stored. The data is usually composed of a plurality of blocks. Therefore, the header block is identified first. The transfer indicating part 23 sends a transfer instruction for the identified block to the storage device 4. Generally, the transfer indicating part 23 specifies an address of the system memory 3 and sends a transfer instruction to the storage device 4, and then the storage device 4 transfers block data to the system memory 3 using own DMA function under the transfer instruction. However, a different operation is performed in the present embodiment.

The host CPU 2 usually manages several types of peripheral apparatuses such as the storage device 4 and the TOE 5, including the system memory 3, in one address space (a main memory space). For example, in an example of FIG. 2, a address space is mapped with 512 MB for the system memory 3, 2 MB for the storage device 4, and 1 MB for the TOE 5.

For the system memory 3, an address space decided by memory capacity is mapped in the main memory space. In contrast, peripheral apparatuses are usually equipped with a control register accessible by the host CPU 2, which is mapped in the main memory space. The example of FIG. 2 shows a 32-bit address space with a given size that is not limited to any size.

The TOE 5 generally has a DMA function like the storage device 4. When the TOE 5 acquires data from the host CPU 2, it retrieves data that has been stored in the system memory 3 by the host CPU 2, with its DMA function. Moreover, when the storage device 4 transmits data to the TOE 5 or vise versa, the storage device 4 and the TOE 5 use their DMA functions. In both cases, data is transmitted through the system memory 3. If data has to be transmitted always through the system memory 3, the host CPU 2 has to store data in the system memory 3 in advance, hence the host CPU 2 has to bear a heavy processing load.

For the reason discussed above, an interface that accepts writing of data to be transmitted to the TOE 5 is provided as a slave, in the embodiment. Here, the slave is the process to accept (hold) data to be transmitted to the TOE 5, without transferring the data to the system memory 3. The data receiving part 51 is the one to function as the slave. The data receiving part 51 may hold data to be transferred in at least part of the control register described above or may be equipped with an interface dedicated to data reception.

The host CPU 2 specifies an address in the data receiving part 51 of the TOE 5 and sends a transfer instruction to the storage device 4. Then, the storage device 4 operates in a manner that it transfers data directly to the TOE 5 without through the system memory 3. In this way, the TOE 5 can receive data directly from the storage device 4.

In the case of PCI Express for example, there is a switch between devices. The switch operates in a manner that it detects an address in a register of the TOE 5 to which the data output from the storage device 4 is directed and sends the data to the TOE 5.

In such a case described above, there is no particular problem for an apparatus that transmits data over the network 10, as a block, like the network storage. On the other hand, there is a problem for an apparatus such as NAS and a VOD server, having its own file system.

In detail, the storage device 4 handles data per block. Therefore, the TOE 5 receives data per block. However, the TOE 5 transmits data of a file per byte over the network 10. Therefore, there is a problem in that the TOE 5 cannot determine from the data per block which byte of a transferred block is the data (to be transmitted over the network 10) of a specified file.

Figures 3, 4:
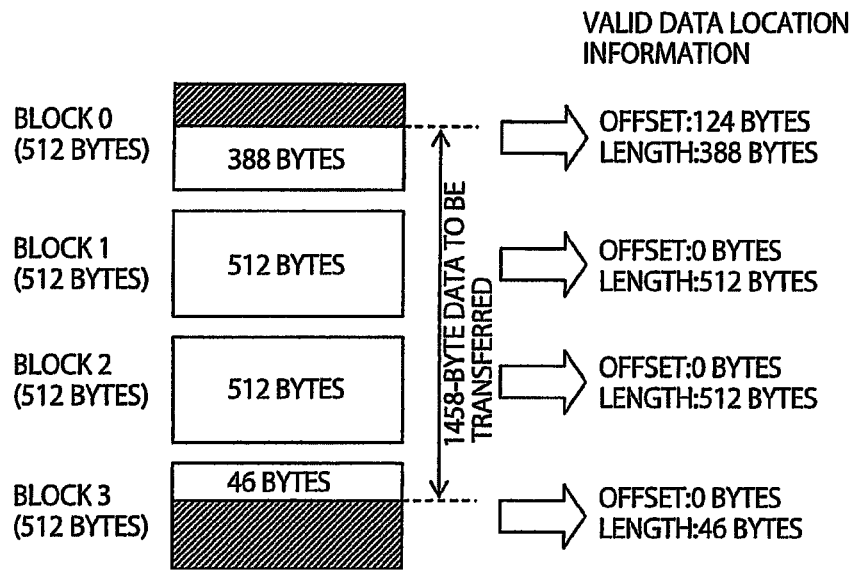
FIG. 3 is a view showing an example of data to be transmitted over a network.
FIG. 4 is a view showing the relationship between transfer instruction numbers and TOE address areas.

Data to be transmitted over the network 10 is information acquired by analyzing a file system, such as shown in FIG. 3. FIG. 3 shows valid data location information with an offset and a length may be indicated with a header byte location and a last byte location. There is no restriction on a form of indication as long as the location of valid data is identified.

The host CPU 2 having the file-system processing part 21 requires to notify the TOE 5 of valid data location information in a block to be transferred. The notification is done by the valid-data-location notifying part 22. In the TOE 5, the data extracting part 52 extracts valid data based on block data transferred from the storage device 4 and valid data location information notified by the valid-data-location notifying part 22. Then, the network processing part 53 divides the valid data into packets to be transmitted and received over the network 10 and then transmits the packet valid data over the network 10. In this way, an apparatus (not shown) connected to the network 10 receives the valid data per packet.

As described above, one file is composed of a plurality of blocks. Therefore, the file-system processing part 21 sends transfer instructions one by one to a plurality of blocks that compose a file to be transmitted. This means that a series of operations described above is repeated for the blocks until the transmission of all data to be transmitted is completed.

Nevertheless, the transfer of block data by the storage device 4 generally has certain latency. Therefore, it sometimes happen that the host CPU 2 sends the storage device 4 the transfer instruction for a plurality of blocks at once, without waiting for the response from the storage device 4 to the transfer instruction on the completion of execution. In this case, however, there is no synchronism among the host CPU 2, the storage device 4, and the TOE 5. Therefore, the notification of valid data location information is performed, for example, with the following techniques.

A first technique is effective for the case where the storage device 4 performs data transfer always in the same order as the order of transfer instructions received by the storage device 4. It is a technique in which, when the host CPU 2 sends transfer instructions for a plurality of blocks to the storage device 4, the host CPU 2 notifies the TOE 5 of the valid data location information in corresponding blocks in the same order as the transfer instructions. The data extracting part 52 of the TOE 5 queues the received valid data location information, for example. Then, when the data extracting part 52 receives block data from the storage device 4, it extracts the valid data location information in order of queuing, to make association between the valid data location information and the block data.

A second technique is used for the case where the storage device 4 performs data transfer in the order different from the order of reception of transfer instructions, with higher priority for the efficiency of an internal process, for example. In this case, there is originally the association between transfer instructions and block data between the host CPU 2 and the storage device 4. Typically, it is the case where an address different from an address to which data is to be transferred is specified, for example. In a known configuration, when the host CPU 2 sends eight transfer instructions to the storage device 4 at once, different addresses on the system memory 3 to which data are to be transferred are specified in the eight transfer instructions. Then, the host CPU 2 looks up the data of each address it specified after it is notified of the completion of transfer of all data from the storage device 4, to acquire each corresponding block data, irrespective of the order of transfer. By contrast, in this embodiment, an address of the TOE 5 is specified as a forwarding address. When using this mechanism of association and, for example, when the host CPU 2 sends eight transfer instructions at once, different address areas among address areas of the TOE 5 are specified for forwarding addresses of the transfer instructions, respectively. For example, as shown in FIG. 2, there are address areas 0x20200000 to 0x202fffff in the TOE 5. Then, the association is made in advance, as shown in FIG. 4, such as a 512-byte area of 0x20280000 to 0x202801ff corresponding to a transfer instruction 0, a 512-byte area of 0x20280200 to 0x202803ff to a transfer instruction 1, a 512-byte area of 0x20280400 to 0x202805ff to a transfer instruction 2, and so on. And then, the host CPU 2 specifies the header of each of these address areas in each transfer instruction. Although the transferred block data is transferred to the TOE 5, the data are transferred to different address areas in the TOE 5. Therefore, when the TOE 5 receives the data, if received block data is the one written in the address starting with 0x20280200 for example, the TOE 5 can identify that it is the block data specified by the transfer instruction 1.

In this case, the host CPU 2 notifies the TOE 5 of eight pieces of data valid-data-location information, such as valid data location information corresponding to the transfer instruction 0, valid data location information to the transfer instruction 1, valid data location information to the transfer instruction 2, and so on. Such information may be notified to different addresses in a register area of the TOE 5 to which valid data location information is to be notified. In this way, the TOE 5 can determine to which transfer instruction both of the received data and valid data location information correspond. Therefore, the data extracting part 52 can make association between these information and addresses. Using addresses is just an example in this embodiment. Any information can be used as long as it can be notified from the storage device 4 to the TOE 5.

As described above, by dividing the address area of a destination of block data, it can be determined to which offset data transferred data corresponds by identifying the address of a destination. This is achieved even if the order of block data received by the TOE 5 is different from the original order of data (the order of data to be transmitted over the network 10, in general). Therefore, it is possible to rearrange the data in the original order of data.

Described above is a technique of identifying bock data with division of the address area of the TOES. The way of division of the address area described above is just an example, and not limited to this. Moreover, the association between the address areas and transfer instructions may be statically performed or dynamically changed with an instruction of association information from the host CPU 2.

With the configuration described above, it is possible to directly transfer data from the storage device 4 to the TOE 5, or data transfer without the intervention of the system memory 3. However, there is case where direct data transfer is not preferable. For example, there is a case where the host CPU 2 itself looks up data in the storage device 4 by executing a given application, not by data transfer. In this case, a transfer instruction is required for transferring data of the storage device 4 to the system memory 3, as already known. The present embodiment can coexist with such a known access technique to the storage device 4. In detail, an I/F is provided so that it can determine whether a processing part, such as an application, for deciding a transfer instruction requests data transfer to the system memory 3 as already known or requests the direct transfer to the TOE 5. The file-system processing part 21 that sends an instruction to the transfer indicating part 23 notifies the part 23 of the information determined by the I/F. Then, the transfer indicating part 23 switches the address of a destination to the system memory 3 or the TOE 5 according to the notification.

In addition, as to the process for abnormal conditions, there is a case where the storage device 4 cannot complete data transfer for some reason such as internal errors in response to a transfer instruction from the host CPU 2. In this case, the storage device 4 notifies the host CPU 2 of errors, for example, with interruption. However, the TOE 5 cannot obtain this information with the configuration described above. Then, a problem occurs such that, if an error occurs during the transfer of a group of data, since the TOE 5 does not know the error, it does nothing but wait for the completion of transfer that never ends, hence cannot move to the next operation. One technique to solve the problem is providing a timeout in the TOE 5. Another technique is that, when an error occurs, the host CPU 2 that receives the notification of error also notifies the TOE 5 of the information.

Figure 5:
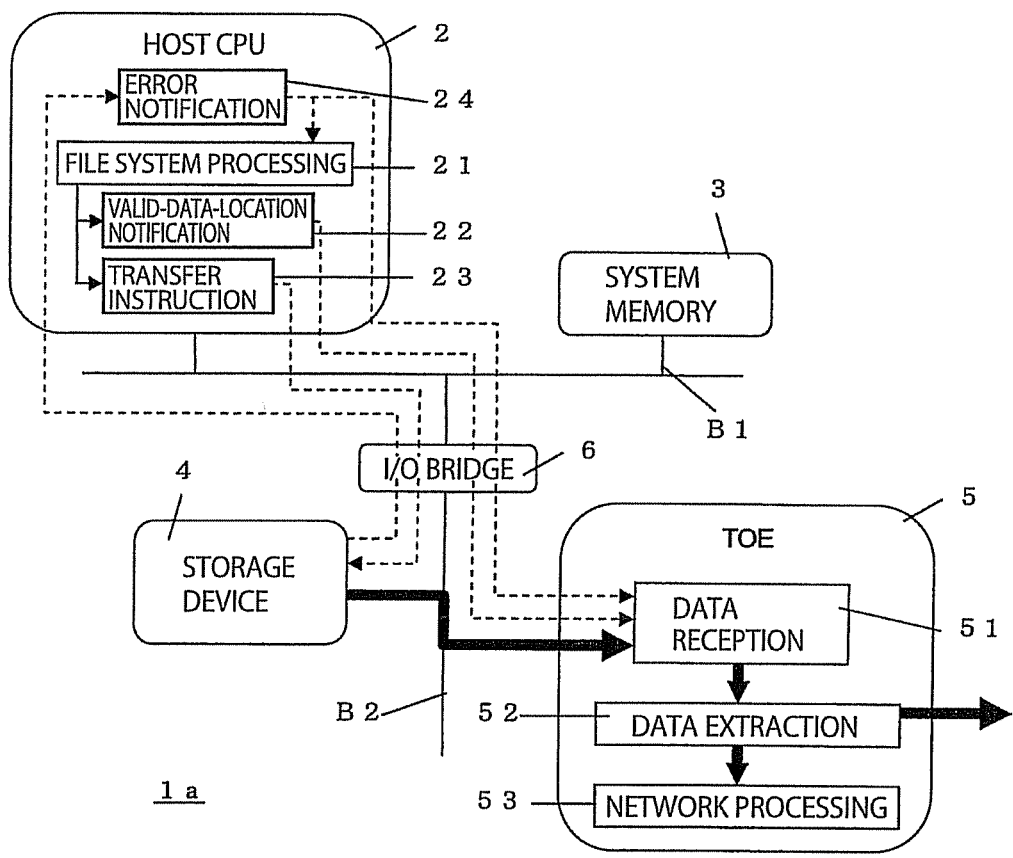
FIG. 5 is a block diagram showing a modification to the first embodiment.

In this way, when a transfer error occurs in the storage device 4, an appropriate error handling process can be performed such that the TOE 5 gives up the transfer of present data and moves to the process of receiving the next data to be transferred. FIG. 5 schematically shows the configuration of the data transmission system in this case. FIG. 5 is a block diagram schematically showing the configuration of a data transmission system 1*a* in which the host CPU 2 has an error notifying part 24 achieved with software, in addition to the configuration of FIG. 1. The error notifying part 24 receives notification from the storage device 4 and notifies of it to the data receiving part 51 of the TOE 5. Besides notifying the TOE 5 of an error, the error notifying part 24 performs an appropriate error handling process such as notifying the file-system processing part 21 of transfer failure so that the file-system processing part 21 moves to the next process.

As described above, in the first embodiment, the host CPU 2 specifies an address of the data receiving part 51 of the TOE 5 and sends a transfer instruction to the storage device 4. Therefore, it is possible that the storage device 4 directly transfers data to the TOE 5 without the intervention of the system memory 3. In this way, higher data-transfer efficiency is achieved for higher transfer rate for a network storage. Moreover, when performing at the known transfer rate, a lower cost and a lower power consumption of the apparatus are achieved. Furthermore, since the host CPU 2 notifies the TOE 5 of the valid data location information for a block to be transferred, the network processing part 53 in the TOE 5 can transmit valid data over the network 10 per packet.

Second Embodiment

Figures 6, 7:
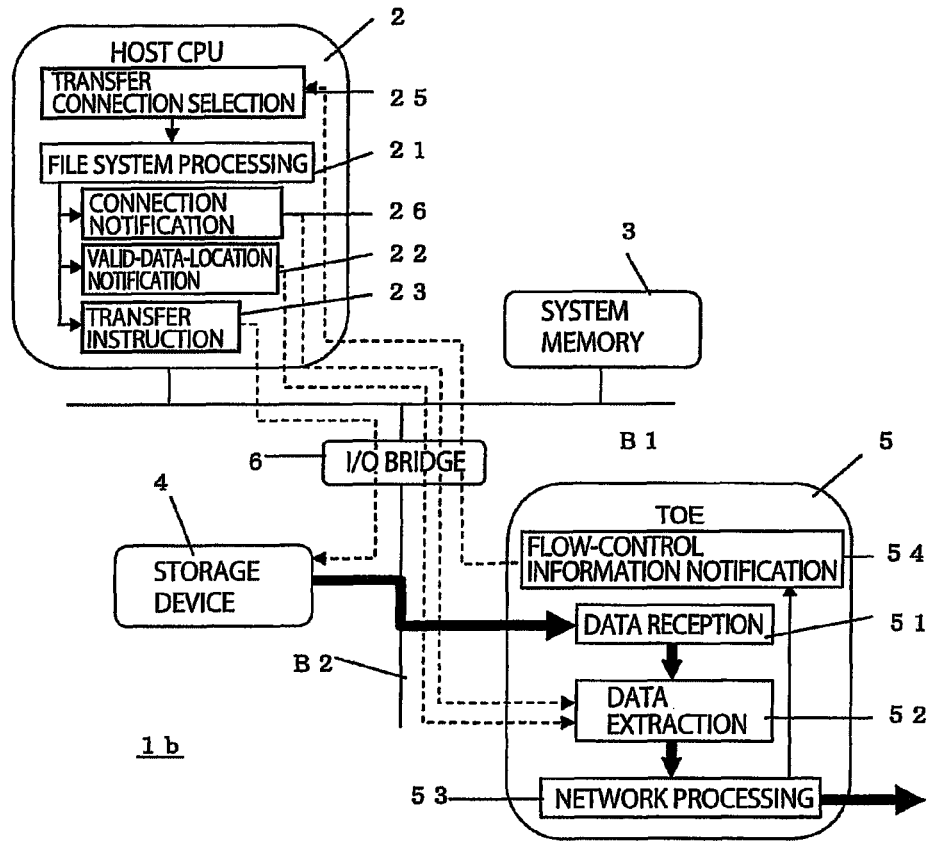
FIG. 6 is a view schematically showing the configuration of a data transmission system according to a second embodiment.
FIG. 7 is a view showing the relationship between connection identifiers and TOE address areas.

A second embodiment shows an example of virtually setting a plurality of connections for data transfer. FIG. 6 schematically shows the configuration of a data transmission system 1*b* according to the second embodiment. In order to achieve data transfer through a plurality of connections, the data transmission system 1*b* of FIG. 6 has, in addition to the configuration of the first embodiment, a transfer-connection selection part 25 and a connection notifying part 26 both achieved with software running on the host CPU 2. The TOE 5 has a flow-control information notifying part 54 for notifying flow-control information that indicates whether new data is acceptable. The transfer-connection selection part 25 performs a process of selecting a connection to be used for data transfer. The connection notifying part 26 performs a process of notifying the TOE 5 of a connection identifier to which a block for data transfer belongs.

In FIG. 6, the parts indicated with the same reference numerals as FIG. 1 operate like in FIG. 1, in which data is retrieved from the storage device 4 and transmitted over the network 10. In addition to that, it is achieved in FIG. 6 that data is retrieved from the storage device 4 and transmitted over the network 10 through separate connections when there are read requests or content providing requests simultaneously from client terminals such as a NAS-like network storage or a VOD server, or applications on a client terminal.

An operational procedure of the data transmission system 1*b* of FIG. 6 is as follows. Like the former embodiment, the host CPU 2 specifies a file with a given technique. However, since there are a plurality of connections in this embodiment, a plurality of files are specified. The transfer-connection selection part 25 confirms flow-control information notified from the flow-control information notifying part 54 of the TOE 5 to identify connections through which TOE 5 can receive data (or it can transfer data) among a plurality of connections and select one connection among the identified connections.

If communication protocol is TCP, a data transmission system performs flow control with a communication-partner apparatus through TCP protocol. Therefore, a transfer rate varies depending on the processing speed of the communication-partner apparatus. Data transfer temporality halts particularly when the communication-partner apparatus temporality halts reception of data. TCP is implemented with congestion control to restrict transmission when there is congestion on the network 10 due to packet loss, resulting in a lowered transfer rate. The TCP flow control and TCP congestion control are performed independently through each TCP connection (having the same meaning as the connection, in this case). This results in a higher or lower transfer rate depending on the connection. Moreover, in the case of a VDO server with RTP protocol, different pieces of content may be transmitted through different connections by real time transmission at different bit rates. This also results in different transfer rates depending on the connections.

As described above, in the case of different transfer rates depending on connections, when the host CPU 2 transfers data from the storage device 4 to the TOE 5 at the same rate without consideration of above, the TOE 5 may not receive data through a particular connection having a low transfer rate. Generally, in this case, data transfer is halted by low-level flow control such as I/O bus B2 (PCI Express, for example). However, with this bus-level flow control, since the data transfer is multiplexed through a plurality of connections, data transfer through another connection is also halted. This means that the delay in data transfer due to the delay in a particular connection causes the delay in data transfer through another connection, resulting in lower transfer efficiency entirely.

In order to solve this problem, it is preferably performed that the TOE 5 notifies the host CPU 2 of which connection the TOE 5 can receive data through at present. The flow-control information notifying part 54 performs the notification of flow control information from the TOE 5 through respective connections. The transfer-connection selection part 25 specifies a connection through which the TOE 5 can receive data and instructs the file-system processing part 21 to transfer data through the specified connection.

In this way, delay due to the transfer delay through a particular connection will not occur in data transfer under bus-level flow control. Therefore, there is no decrease in transfer rate through the other connections, with enhanced entire transfer efficiency in a multi-connection environment.

In more detail, the TOE 5 is equipped with a buffer for temporality storing transferred block data before transmission over the network 10. The buffer is provided for each connection. The network processing part 53 retrieves data from the corresponding buffer for each connection. However, the transfer rate is different among the connection. Therefore, there is such a case where a buffer is quickly opened for a particular connection while another buffer is not quickly opened for a connection of a low transfer rate, with different buffer free space per connection. For the reason above, the flow-control information notifying part 54 notifies the host CPU 2 of the buffer free space per connection. The host CPU 2 checks the buffer free space to perform data transfer as equally as possible over a plurality of connections. It is preferable for the host CPU 2 to transfer data for each block through among connections if buffers are open for one block or more for the connections.

Nevertheless, this is not applied to the case where the transfer efficiency is higher for sequentially retrieving data from a specific file depending on the characteristics of the storage device 4. It may be preferable to perform data transfer with sequential transfer of a group of data through a specific connection followed by data transfer through the next connection, for example. However, this transfer technique may cause large delay in data transfer through latter connections. This may result in buffer underflow for particular connections, although the entire bus transfer bandwidth meets the required performance. Therefore, it is preferable to transfer data for each specific number of blocks as small as possible (ideally, for each one block) sequentially through a plurality of connections.

The notifying part 26 notifies the TOE 5 of a connection identifier to which a block to be transferred belongs. The notification is performed with the same technique as the notification of valid data location information described above.

A first technique is effective when the storage device 4 performs data transfer always in the same order as transfer instructions. That is a technique of notifying the TOE 5 of connection identifiers in the same order as sending transfer instructions. The data extracting part 52 of the TOE 5 queues identifier information from the host CPU 2 and then retrieves the queued identifier information in the same order as receiving data from the storage device 4, thus making association between the transferred block data and the identifier information.

A second technique is effective when the storage device 4 performs data transfer in the different order from transfer instructions. It is a technique to specify different areas of the TOE 5 for the destinations' addresses through different connections when issuing transfer instructions. For example, as shown in FIG. 7, the host CPU 2 specifies a destination's address to data through each connection. This enables the TOE 5, when receiving data, to identify which of its address area the data is directed, thus identifying the connection to which the data belongs so as to buffer the data in an appropriate buffer. In FIG. 6, the notification of connection information from the connection notifying part 26 to the data extracting part 52 is indicated by a broken line. The notification of connection identifier information via the storage device 4 using addresses as described is also included in this embodiment. The address used in the present embodiment is just an example. Any information that can be notified from the storage device 4 to the TOE 5 can be used. Moreover, the mapping of addresses and connection identifiers is also just an example, which can be dynamically changed. In particular, the address space is finite, hence dynamic allocation is effective for a large connection identifier space.

As described above, in the second embodiment, data transfer is performed as equally as possible through among a plurality of connections. Therefore, data transfer is achieved with no decrease in transfer efficiency through a plurality of connections. Accordingly, further efficient data transfer is achieved with a smaller processing load to the host CPU 2.

Third Embodiment

Figure 8:
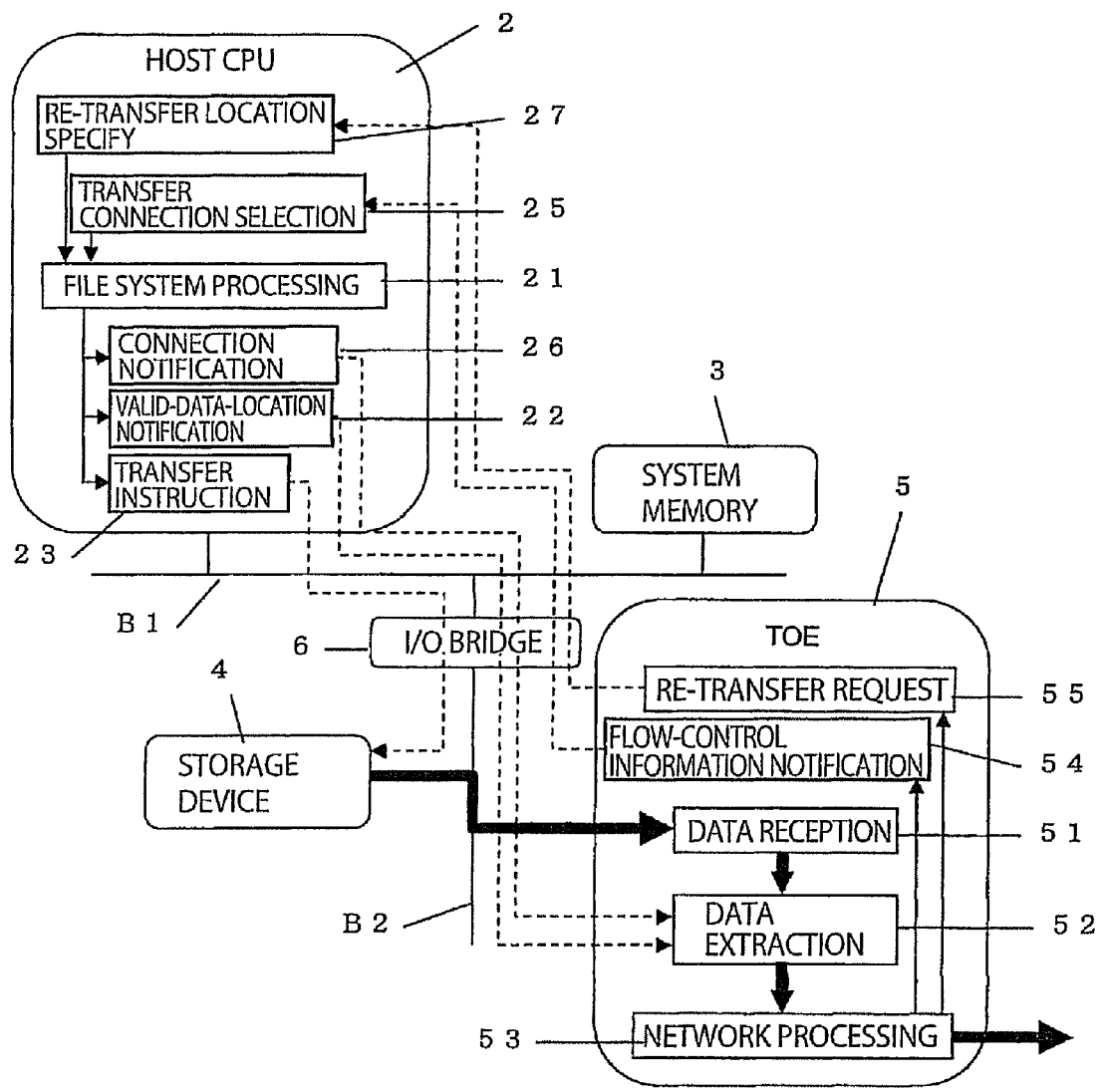
FIG. 8 is a view schematically showing the configuration of a data transmission system according to a third embodiment.

A third embodiment aims for decrease in the size of a data buffer. FIG. 8 schematically shows the configuration of a data transmission system 1c according to the third embodiment. The data transmission system is of FIG. 8 has, in addition to the configuration of FIG. 6, a re-transfer location specifying part 27 achieved with software running on the host CPU 2, and a re-transfer requesting part 55 for the TOE 5.

The data transmission system is of FIG. 8 has a feature of decreasing the size of a data buffer in the TOE 5 described in the second embodiment, in addition to the direct data transfer from the storage device 4 to the TOE 5 without the intervention of the system memory 3.

For example, in the case TCP communication protocol, a packet has to be re-transferred when there is packet loss on the network 10. Therefore, transmitted data has to be held until there is acknowledgement from a communication-partner apparatus. Generally, the TOE 5 is equipped with a data buffer for storing transmitted data.

Different from above, in the present embodiment, the re-transfer requesting part 55 in the TOE 5 requests block data re-transfer from the host CPU 2. When the host CPU 2 receives this request, the re-transfer location specifying part 27 identifies the location of data to be re-transferred on a file and instructs the storage device 4 to re-transfer data for a required amount. In this way, decrease in the size of a data buffer described above can be achieved.

In detail, this is achieved as follows. Regular data transfer and data transfer over the network 10 are performed in the same way as the second embodiment. However, in the present embodiment, since no data buffer exists in the TOE 5, the flow-control information notifying part 54 described above passes TCP flow control information to the hose CPU 2. The TCP flow control information in this case is a TCP receiving window (the number of transmissible bytes) of a communication-partner apparatus connected to the network 10. The host CPU 2 gives data to the TOE 5 as much as possible for the communication-partner apparatus to receive. Then, the TOE 5 transmits the data as it is over the network 10.

When there is packet loss on the network 10, the network processing part 53 detects it to determine that packet re-transfer is required. Then, the re-transfer requesting part 55 specifies a connection identifier that has to be re-transferred and an offset location of the data to be re-transferred and its length information and requests the re-transfer of block data from the host CPU 2. When the host CPU 2 accepts the request, the re-transfer location specifying part 27 identifies a file through the connection for this data and also identifies an offset location and a length of the file based on the data offset location and length, thus transferring the data. Thereafter, data transfer is performed in the same way as the second embodiment. On receiving the data, the TOE 5 transmits the data over the network 10 (the data become a packet to be re-transferred).

Described above is an example of data re-transfer in TCP communication. However, there is no re-transfer in RTP communication with a VOD server, for example. Nevertheless, for example, FEC may be used for compensating for data loss to packet loss on the network 10. Pro-MPEG FEC is used for IPTV, for example. Pro-MPEG FEC requires the processes as follows, although not explained in detail. RTP data packets are arranged in matrix in order of sequence numbers. The data portions of packets that are aligned in the vertical direction on the matrix are XORed to generate data portions of the corresponding FEC packets. The generation of FEC packets is performed after the transmission of RPT packets. Therefore, the generation of FEC packets with the computation described above requires the retrieval of transmitted data thereafter. Even in this case, in general, the TOE 5 is equipped with a data buffer for achieving another retrieval. However, in the present embodiment, with the configuration described above, another retrieval is achieved in a manner that data is retrieved again not from the data buffer but from the storage device 4, thus also achieving decrease in the size of a data buffer in the TOE 5. In this way, even when FEC is used, the decrease in the size of a data buffer in the TOE 5 is achieved according to the present embodiment.

It is possible to decrease the size of a data buffer by the configuration described above. However, there is a difference in data size between block data transmitted from the storage device 4 and a packet transmitted over the network 10. Therefore, buffering for absorbing this difference in data size is required at least. For example, for block data of 512 bytes in a packet having a size of 1460 bytes, the total byte for the TOE 5 to receive thee pieces of block data from the storage device 4 is 1536 bytes. At 1536 bytes, the TOE 5 can transmit one packet for the first time. However, 76 (=1536−1460) bytes remain after the transmission of one packet and become a 76-byte header of the next packet. Therefore, the 76 bytes have to be buffered until the next packet transmission. In the present embodiment, although a large data buffer is not necessary, such a small buffer is necessary. Moreover, such a small buffer is necessary for each connection. Nevertheless, its buffer size is vary small (less than the data size of one packet for each connection) so that the cost for memories is drastically lowered. Furthermore, the buffer may be achieved with, for example, an internal memory, not an external memory (such as DRAM), for instance, an LSI such as ASIC or FPGA that is used as the TOE 5, thus lowering the total cost or achieving high performance.

A technique to further reduce the buffer size discussed above is to set the block size in the storage device 4 to the size obtained by multiplying the packet size on the network 10 by a natural number. For example, in the case of block data of a 512-byte size, a network packet of a 512-byte size can be transmitted as it is from the TOE 5 when the TOE 5 receives the block data, with no data to be buffered after the transmission. Moreover, in the case of block data of a 4096-byte size and a packet of 1024-byte data size, the TOE 5 can transmit four packets when receiving one block data, with no data to be buffered after the transmission. In this way, the buffer size in the TOE 5 is reduced further so that the advantage of the present embodiment becomes more remarkable.

As described above, according to the third embodiment, the size of a data buffer in the TOE 5 can be reduced to achieve lower cost and power consumption for the data transmission system so that the advantage of the present embodiment becomes more remarkable.

The embodiment of the present invention is not limited to the respective embodiments described above but includes a variety of modifications conceivable by parsons skilled in the art. The advantages of the present invention are also not limited to those explained above. Accordingly, various addition, changes, and partial omissions may be made without departing from the scope and spirit of the inventions derived from the accompanying claims and their equivalents.

At least part of the data transmission system explained in the embodiment may be configured with hardware or software. When it is configured with software, a program that performs at least part of the functions of the data transmission system 1b may be stored in a storage medium such as a flexible disk and CD-ROM, and then installed in a computer to run thereon. The storage medium may not be limited to a detachable one such as a magnetic disk and an optical disk but may be a standalone type such as a hard disk drive and a memory.

Moreover, a program that achieves the function of at least part of the data transmission system may be distributed via a communication network (including wireless communication) such as the Internet. The program may also be distributed via an online network such as the Internet or a wireless network, or stored in a storage medium and distributed under the condition that the program is encrypted, modulated or compressed.

The invention claimed is:

1. A data transmission system comprising:
   a processor configured to be capable of read and write to a main memory device;
   a data storage apparatus configured to transmit stored data per block; and
   a protocol processing apparatus configured to perform a specific communication protocol process on behalf of the processor,
   wherein the processor further comprises:
   a data specifying part configured to specify data per block to be transmitted from the data storage apparatus; and
   a transfer indicating part configured to indicate data transfer from the data storage apparatus to the protocol processing apparatus,
   a file-system processing part configured to specify a group of data per block corresponding to a file and a location of valid data in the group of data, based on a file system in the data storage apparatus; and
   an valid-data-location notifying part configured to notify the protocol processing part of location information of the valid data,
   the protocol processing apparatus comprises
   a data receiving part configured to directly receive data transferred per block from the data storage apparatus, without relaying the main memory device;
   a network processing part configured to transmit the data received per block by the data receiving part over a network;

a data extracting part configured to extract the valid data based on data per block received by the data receiving part and the location information of the valid data, wherein the network processing part transmits the valid data extracted by the data extracting part over the network.

2. A data transmission system comprising:

a processor configured to be capable of read and write to a main memory device;

a data storage apparatus configured to transmit stored data per block on an I/O bus; and a protocol processing apparatus connected to the I/O bus and configured to perform a specific communication protocol process on behalf of the processor, a plurality of connections for data transfer, the connections being virtually set between the data storage apparatus and the protocol processing apparatus, wherein the processor comprises:

a data specifying part configured to specify data per block to be transmitted from the data storage apparatus;

a transfer indicating part configured to indicate data transfer from the data storage apparatus to the protocol processing apparatus by specifying address information of the protocol processing apparatus;

a connection notifying part configured to notify the protocol processing apparatus of an identifier of a connection to be used for data transmission from the data storage apparatus to the protocol processing apparatus;

a connection selection part configured to select a connection to be used for data transmission from the data storage apparatus to the protocol processing apparatus, based on flow control information from the protocol processing apparatus; and a data specifying part configured to specify data per block to be transmitted through a connection selected by the connection selection part the protocol processing apparatus includes:

a data receiving part configured to directly receive data transferred per block from the data storage apparatus to the I/O bus, without relaying the main memory device; and a network processing part configured to transmit the data received per block by the data receiving part over a network per packet.

3. The system in claim 2, wherein the protocol processing apparatus further includes a flow-control information notifying part configured to notify the processor of the flow control information for each connection to transfer data equally as much as possible over the connections.

4. A data transmission system, comprising:

a processor configured to be capable of read and write to a main memory device;

a data storage apparatus configured to transmit stored data per block on an I/O bus; and a protocol processing apparatus connected to the I/O bus and configured to perform a specific location protocol process on behalf of the processor, wherein the processor includes:

a data specifying part configured to specify data per block to be transmitted from the data storage apparatus; and a transfer indicating part configured to indicate data transfer from the data storage apparatus to the protocol processing apparatus by specifying address information of the protocol processing apparatus, the protocol processing apparatus includes:

a data receiving part configured to directly receive data transferred per block from the data storage apparatus to the I/O bus, without relaying the main memory device; and a network processing part configured to transmit the data received per block by the data receiving part over a network per packet, wherein the protocol processing apparatus further includes a re-transfer requesting part configured to request data to be re-transferred to the processor, and the processor further includes a re-transfer location specifying part configured to specify a file of data to be re-transferred, and an offset location and a length of the file, in response to the request.

5. A data transmission system, comprising:

a processor configured to be capable of read and write to a main memory device;

a data storage apparatus configured to transmit stored data per block on an I/O bus; and a protocol processing apparatus connected to the I/O bus and configured to perform a specific communication protocol process on behalf of the processor, wherein the processor includes:

a data specifying part configured to specify data per block to be transmitted from the data storage apparatus; and a transfer indicating part configured to indicate data transfer from the data storage apparatus to the protocol processing apparatus by specifying address information of the protocol processing apparatus, the protocol processing apparatus includes:

a data receiving part configured to directly receive data transferred per block from the data storage apparatus to the I/O bus, without relaying the main memory device; and a network processing part configured to transmit the data received per block by the data receiving part over a network per packet, wherein the transfer indicating part is capable of selectively indicating whether data retrieved from data storage apparatus is transferred or the retrieved data is directly transferred to the data receiving part without relaying the without relaying the main memory device.

6. A data transmission system, comprising:

a processor configured to be capable of read and write to a main memory device;

a data storage apparatus configured to transmit stored data per block on an I/O bus; and a protocol processing apparatus connected to the I/O bus and configured to perform a specific communication protocol process on behalf of the processor, wherein the processor includes:

a data specifying part configured to specify data per block to be transmitted from the data storage apparatus; and a transfer indicating part configured to indicate data transfer from the data storage apparatus to the protocol processing apparatus by specifying address information of the protocol processing apparatus, the protocol processing apparatus includes:

a data receiving part configured to directly receive data transferred per block from the data storage apparatus to the I/O bus, without relaying the main memory device; and a network processing part configured to transmit the data received per block by the data receiving part over a network per packet, wherein the processor further includes an error notifying part configured to notify the data receiving part of a transfer error when the processor receives a transfer error signal generated in the data storage apparatus, when the notification is received from the error notifying part, the data receiving part discards currently received data and waits for data per block that follows the currently received data.

7. A storage medium having a data transmission program stored therein, the program being readable by a computer, wherein the program controls;

a processor configured to be capable of read and write to a main memory device;

a data storage apparatus configured to transmit stored data per block; and a protocol processing apparatus configured to perform a specific communication protocol process on behalf of the processor, wherein the program comprising:

specifying data per block to be transmitted from the data storage apparatus;

indicating data transfer from the data storage apparatus to the protocol processing apparatus by specifying address information of the protocol processing apparatus;

directly receiving at the protocol processing apparatus data transferred per block from the data storage apparatus without relaying the main memory device;

transmitting the data received per block at the protocol processing apparatus over a network;

specifying a group of data per block corresponding to a file and a location of valid data in the group of data, based on a file system in the data storage apparatus;

notifying the protocol processing part of location information of the valid data; and extracting the valid data based on data per block received by the protocol processing apparatus and the location information of the valid data, wherein the protocol processing apparatus transmits the extracted valid data over the network.

8. A storage medium having a data transmission program stored therein, the program being readable by a computer, wherein the program controls:

a processor configured to be capable of read and write to a main memory device;

a data storage apparatus configured to transmit stored data per block on an I/O bus; and a protocol processing apparatus connected to the I/O bus and configured to perform a specific communication protocol process on behalf of the processor; and the program comprising:

specifying data per block to be transmitted from the data storage apparatus;

indicating data transfer from the data storage apparatus to the protocol processing apparatus by specifying address information of the protocol processing apparatus;

directly receiving at the protocol processing apparatus data transferred per block from the data storage apparatus to the I/O bus, without relaying the main memory device;

transmitting the data received per block at the protocol processing apparatus over a network per packet, setting a plurality of connections for data transfer between the data storage apparatus and the protocol processing apparatus;

notifying the protocol processing apparatus of an identifier of a connection to be used for data transmission from the data storage apparatus to the protocol processing apparatus;

selecting a connection to be used for data transmission from the data storage apparatus to the protocol processing apparatus, based on flow control information from the protocol processing apparatus; and specifying data per block to be transmitted through a selected connection.

9. The storage medium in claim 8, wherein the program further comprising:

notifying the processor of the flow control information for each connection to transfer data equally as much as possible over the connections.

10. A storage medium having a data transmission program stored therein, the program being readable by a computer, wherein the program controls:

a processor configured to be capable of read and write to a main memory device;

a data storage apparatus configured to transmit stored data per block on an I/O bus; and a protocol processing apparatus connected to the I/O bus and configured to perform a specific communication protocol process on behalf of the processor; and the program comprising:

specifying data per block to be transmitted from the data storage apparatus;

indicating data transfer from the data storage apparatus to the protocol processing apparatus by specifying address information of the protocol processing apparatus;

directly receiving at the protocol processing apparatus data transferred per block from the data storage apparatus to the I/O bus, without relaying the main memory device; and transmitting the data received per block at the protocol processing apparatus over a network per packet, wherein the program further comprising:

requesting data to be re-transferred to the processor; and specifying a file of data to be re-transferred, and an offset location and a length of the file, in response to the request.

11. A storage medium having a data transmission program stored therein, the program being readable by a computer, wherein the program controls:

a processor configured to be capable of read and write to a main memory device;

a data storage apparatus configured to transmit stored data per block on an I/O bus; and a protocol processing apparatus connected to the I/O bus and configured to perform a specific communication protocol process on behalf of the processor; and the program comprising:

specifying data per block to be transmitted from the data storage apparatus;

indicating data transfer from the data storage apparatus to the protocol processing apparatus by specifying address information of the protocol processing apparatus;

directly receiving at the protocol processing apparatus data transferred per block from the data storage apparatus to the I/O bus, without relaying the main memory device; and transmitting the data received per block at the protocol processing apparatus over a network per packet, wherein the program is capable of selectively indicating whether data retrieved from data storage apparatus is transferred or the retrieved data is directly transferred to the data receiving part without relaying the main memory device.

12. A storage medium having a data transmission program stored therein, the program being readable by a computer, wherein the program controls:

a processor configured to be capable of read and write to a main memory device;

a data storage apparatus configured to transmit stored data per block on an I/O bus; and a protocol processing apparatus connected to the I/O bus and configured to perform a specific communication protocol process on behalf of the processor; and the program comprising:

specifying data per block to be transmitted from the data storage apparatus;

indicating data transfer from the data storage apparatus to the protocol processing apparatus by specifying address information of the protocol processing apparatus;

directly receiving at the protocol processing apparatus data transferred per block from the data storage apparatus to the I/O bus, without relaying the main memory device; and transmitting the data received per block at the protocol processing apparatus over a network per packet, wherein the program runs on the computer to perform the steps of:

notifying the protocol processing apparatus of a transfer error when the processor receives a transfer error signal generated in the data storage apparatus; and when receiving the notification of the transfer error, discarding currently received data and waiting for data per block that follows the currently received data.

* * * * *